United States Patent [19]

Mashimo

[11] Patent Number: 4,796,097
[45] Date of Patent: Jan. 3, 1989

[54] OPTICAL DISC RECORDING APPARATUS FOR A COLOR TELEVISION SIGNAL

[75] Inventor: Akira Mashimo, Tokorozawa, Japan
[73] Assignee: Teac Corporation, Musashino, Japan
[21] Appl. No.: 68,016
[22] Filed: Jun. 26, 1987
[30] Foreign Application Priority Data

Jul. 1, 1986 [JP] Japan .................................. 61-154691

[51] Int. Cl.$^4$ .......................... H04N 9/80; H04N 5/85
[52] U.S. Cl. .................................... 358/330; 358/315; 358/327; 369/116
[58] Field of Search ................ 358/335, 310, 315, 327, 358/330; 360/31; 369/116, 54, 58

[56] References Cited
U.S. PATENT DOCUMENTS 4,455,634  6/1984  Efron et al. ............................ 369/58
4,723,175  2/1988  Ichinoi et al. ......................... 358/330

Primary Examiner—Donald McElheny, Jr.
Attorney, Agent, or Firm—Ladas & Parry

[57] ABSTRACT

An optical disc recording apparatus comprises a multiplexing circuit for frequency-division-multiplexing an FM luminance signal and the frequency converted carrier chrominance signal with a variable frequency-division-multiplexing ratio so that a frequency-division-multiplexing ratio of the frequency converted carrier chrominance signal with respect to the FM luminance signal becomes greater approximately proportionally to a relative linear velocity between an optical disc which rotates at the constant angular velocity and a laser beam which scans the optical disc, a limiter for converting an output frequency division multiplexed signal of the multiplexing circuit into a square wave having a constant amplitude, an amplitude varying circuit for varying an amplitude of the output square wave of the limiter approximately proportionally to the relative linear velocity, and a recording circuit including a laser light source for generating the laser beam responsive to an output signal of the amplitude varying circuit.

6 Claims, 1 Drawing Sheet

OPTICAL DISC RECORDING APPARATUS FOR A COLOR TELEVISION SIGNAL

BACKGROUND OF THE INVENTION

The present invention generally relates to optical disc recording apparatuses, and more particularly to an optical disc recording apparatus which records a frequency division multiplexed signal of a frequency modulated luminance signal and a frequency converted carrier chrominance signal on an optical disc by use of a laser beam.

Conventionally, there are known recording apparatuses which record and reproduce a video signal on and from an optical disc by use of a laser beam generated from a laser diode. In one type of recording apparatus, a frequency division multiplexed signal is recorded and reproduced from the optical disc, where the frequency division multiplexed signal is obtained by frequency-division-multiplexing a frequency modulated (FM) luminance signal and a frequency converted carrier chrominance signal which has been frequency-converted into a frequency range lower than that of the FM luminance signal. In this type of recording apparatus, a current dependent on a level of the frequency division multiplexed signal is supplied to a laser diode which generates the laser beam at the time of a recording, so that a maximum value of the laser power is obtained at a maximum value of an envelope of the frequency division multiplexed signal and a minimum value of the laser power is obtained at a minimum value of the envelope of the frequency division multiplexed signal.

However, the envelope of the frequency division multiplexed signal varies depending on a level of the frequency converted carrier chrominance signal. For this reason, the envelope of the frequency division multiplexed signal has an intermediate value between the maximum and minimum values. But it is difficult to obtain the laser power corresponding to this intermediate value of the envelope of the frequency division multiplexed signal, and it is thus difficult to make the laser power setting for an optimum recording.

In addition, a relative linear velocity between the optical disc which rotates at a constant angular velocity and the laser beam which scans the optical disc becomes smaller toward the inner periphery of the optical disc. But although an amplitude of a reproduced FM luminance signal becomes smaller as the relative linear velocity becomes smaller, an amplitude of a reproduced frequency converted carrier chrominance signal remains virtually unchanged.

Therefore, in the conventional recording apparatus which records the frequency division multiplexed signal on the optical disc with a constant mixing level ratio (multiplexing level ratio) between the FM luminance signal and the frequency converted carrier chrominance signal throughout the entire recording region on the optical disc, a mixing level ratio of a reproduced frequency division multiplexed signal changes at the time of a reproduction depending on a radial scanning position on the optical disc. As a result, there is a problem in that the quality of the reproduced picture which is obtained from the optical disc at the time of the reproduction changes depending on the radial scanning position on the optical disc.

SUMMARY OF THE INVENTION

Accordingly, it is a general object of the present invention to provide a novel and useful optical disc recording apparatus in which the problems described heretofore are eliminated.

Another and more specific object of the present invention is to provide an optical disc recording apparatus which controls a level within a frequency division multiplexed signal of an FM luminance signal and a frequency converted carrier chrominance signal depending on a radial scanning position on an optical disc, so that an optimum recording can be carried out. According to the optical disc recording apparatus of the present invention, a frequency-division-multiplexing ratio of the frequency converted carrier chrominance signal with respect to the FM luminance signal becomes greater approximately proportionally to a relative linear velocity between the optical disc which rotates at a constant angular velocity and a laser beam which scans the optical disc, and for this reason, it is possible to always keep the frequency-division-multiplexing ratio between the two signals constituting the frequency division multiplexed signal constant. Therefore, it is possible to suppress the change in the quality of a reproduced picture caused by the change in the relative linear velocity, and it is possible to obtain a reproduced picture having a constant picture quality regardless of the radial scanning position on the optical disc.

Still another object of the present invention is to provide an optical disc recording apparatus comprising a multiplexing circuit for frequency-division-multiplexing an FM luminance signal and a frequency converted carrier chrominance signal with a variable frequency-division-multiplexing ratio so that a frequency-division-multiplexing ratio of the frequency converted carrier chrominance signal with respect to the FM luminance signal becomes greater approximately proportionally to a relative linear velocity between an optical disc which rotates at a constant angular velocity and a laser beam which scans the optical disc, a limiter for converting an output frequency division multiplexed signal of the multiplexing circuit into a square wave having a constant amplitude, and an amplitude varying circuit for varying an amplitude of the output square wave of the limiter approximately proportionally to the relative linear velocity and for supplying an output signal to a laser light source which generates the laser beam.

Although an amplitude of a reproduced FM luminance signal becomes smaller than that at the time of the recording as the relative linear velocity becomes smaller, an amplitude of a reproduced frequency converted carrier chrominance signal remains virtually unchanged from that at the time of the recording. Hence, the multiplexing circuit varies the frequency-division-multiplexing ratio approximately proportionally to the relative linear velocity so that a relative multiplexing ratio (amplitude ratio) between a reproduced FM luminance signal and a reproduced frequency converted carrier chrominance signal becomes approximately constant.

The frequency division multiplexed signal from the multiplexing circuit is converted into the square wave in the limiter so that the amplitude thereof is constant, in order to set the laser power of the laser beam to an optimum recording value.

Since the optimum recording value of the laser power changes approximately proportionally to the relative linear velocity, the amplitude varying circuit varies the amplitude of the square wave approximately proportionally to the relative linear velocity so as to constantly set the laser power to the optimum recording value regardless of the relative linear velocity.

Other objects and further features of the present invention will be apparent from the following deaailed description when read in conjunction with the accompanying drawings.

DETAILED DESCRIPTION

Figure 1:
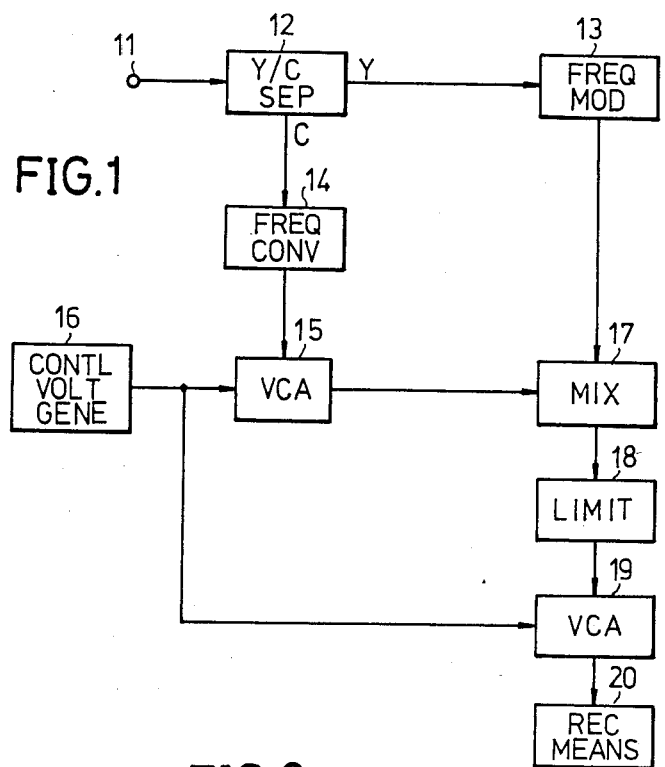
FIG. 1 is a system block diagram showing an embodiment of the optical disc recording apparatus according to the present invention.
Figure 2:
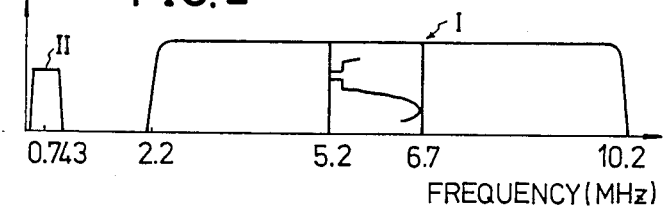
FIG. 2 shows frequency spectrums of signals at essential parts of the block system shown in FIG. 1.

FIG. 1 shows an embodiment of the optical disc recording apparatus according to the present invention. In FIG. 1, a color video signal applied to an input terminal 11 is supplied to a luminance/chrominance signal separating circuit 12 wherein a luminance signal Y and a carrier chrominance signal C are separated from the color video signal. The separated luminance signal Y is supplied to a frequency modulator 13 and is frequency-modulated into a frequency modulated (FM) luminanee signal. In FIG. 2, a frequency spectrmm I indicates the frequency spectrum of the FM luminance signal which is outputted from the frequency modulator 13. As shown in FIG. 2, the FM luminance signal has a carrier deviation band of 5.2 MHz to 6.7 MHz, where 5.2 MHz is the carrier frequency corresponding to a synchronizing tip and 6.7 MHz is the carrier frequency corresponding to a white peak level.

On the other hand, the separated carrier chrominance signal C is supplied to a frequency converter 14 and is frequency-converted into a frequency range lower than a frequency range of the FM luminance signal. In other words, the carrier chrominance signal C is frequency-converted into a frequency converted carrier chrominance signal having a chrominance subcarrier frequency of approximately 743 kHz, for example. In FIG. 2, a frequency spectrum II indicates the frequency spectrum of the frequency converted carrier chrominance signal. As may be seen from FIG. 2, the frequency converted carrier chrominance signal occupies a low frequency range of approximately 743 kHz±500 kHz which is unoccupied by the FM luminance signal.

In the frequency converter 14, a frequency converting carrier for frequency-converting the carrier chrominance signal C into the low frequency range has such a phase that the phase is inverted for every one horizontal scanning period during a certaing one revolution period (for example, one frame) of an optical disc (not shown), the phase is constant for the next one revolution period and such phase relationship is alternately repeated for each one revolution period. Accordingly, out of a plurality of successive tracks which are formed on the optical disc at a rate of one track turn per one revolution of the optical disc, the frequency converted carrier chrominance signal recorded on one of two mutually adjacent tracks has the phase which is inverted for every one horizontal scanning period while the frequency converted carrier chrominance signal recorded on the other of the two mutually adjacent tracks has the constant phase. Hence, by use of a known means, it is possible to eliminate a crosstalk of the frequency converted carrier chrominance signal which is reproduced from a track adjacent to a predetermined track which is being scanned and mixes into the frequency converted carrier chrominance signal which is reproduced from the predetermined track at the time of the reproduction.

The frequency converted carrier chrominance signal from the frequency converter 14 is supplied to a voltage controlled amplifier (hereinafter simply referred to as a VCA) 15 wherein an amplitude of the frequency converted carrier chrominance signal is variably controlled responsive to a control voltage from a control voltage generating circuit 16. The control voltage indicates a radial scanning position of a main laser beam on the optical disc. For example, the control voltage may be produced based on pre-recorded address signal which is reproduced from the optical disc by use of sub laser beams different from the main laser beam which is used for the recording of the video signal (frequency division multiplexed signal of the FM luminance signal and the frequency converted carrier chrominance signal). A level of the control voltage gradually increases (or decreases) as the radial scanning position on the optical disc changes from the inner periphery toward the outer periphery of the optical disc.

Figure 3:
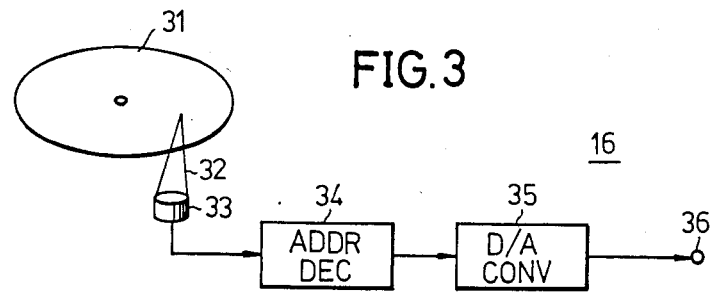
FIG. 3 is a system block diagram showing an embodiment of a control voltage generating circuit in the block system shown in FIG. 1.

FIG. 3 shows an embodiment of the control voltage generating circuit 16. An address signal is pre-recorded on an optical disc 31, and a reproducing means 33 generates sublaser beams 32 for reproducing the address signal. A reproduced address signal from the reproducing means 33 is supplied to an address decoder 34 wherein the reproduced address signal is decoded. A decoded output of the address decoder 34 is supplied to a digital-to-analog (D/A) converter 35 wherein the decoded output is subjected to a digital-to-analog conversion. Hence, the D/A converter 35 produces a voltage which gradually increases (or decreases) as the address value on the optical disc 31 changes from a value within the inner peripheral portion to a value within the outer peripheral portion. This voltage from the D/A converter 35 is passed through a terminal 36 and is supplied to the VCA 15 shown in FIG. 1 as the control voltage.

Accordingly, the gain of the VCA 15 is controlled by the control voltage so as to gradually increase as the radial scanning position of the main laser beam on the optical disc advances from the inner periphery to the outer periphery of the optical disc, that is, as the relative linear velocity between the optical disc which rotates at the constant angular velocity and the main laser beam which scans the optical disc increases. An amplitude of the frequency converted carrier chrominance signal changes dependin on the color saturation, but the amplitude of the frequency converted carrier chrominance signal within all of the intervals thereof is originally controlled so that an amplitude of a constant amplitude color burst signal gradually increases as the relative linear velocity increases.

A mixer 17 mixes, that is, frequency-division-multiplexes the FM luminance signal from the frequency modulator 13 and the frequency converted carrier chrominance signal from the VCA 15, and produces a frequency division multiplexed signal having the frequency spectrum shown in FIG. 2. The amplitude of the FM luminance signal from the frequency modulator 13 is always greater than the amplitude of the frequency converted carrier chrominance signal from the VCA 15, but the amplitude of the FM luminance signal is constant regardless of the change in the relative linear velocity. For this reason, the mixing ratio (multiplexing ratio) of the frequency converted carrier chrominance signal relatively increases with respect to the FM luminance signal as the relative linear velocity increases.

The frequency division multiplexed signal from the mixer 17 is supplied to a limiter 18 and is converted into a square wave having a constant amplitude. The output square wave of the limiter 18 has a pulse width (duty cycle) dependent on the amplitude of the output frequency converted carrier chrominance signal of the VCA 15. The output square wave of the limiter 18 is supplied to a VCA 19 which is controlled of the gain thereof responsive to the control voltage from the control voltage generating circuit 16. Hence, in the VCA 19, the amplitude of the square wave from the limiter 18 is gradually increased approximately proportionally to the relative linear velocity. An output signal of the VCA 19 is supplied to recording means 20 which is known.

The recording means 20 comprises a laser light source (not shown) such as a laser diode for generating the main laser beam. The output signal of the VCA 19 is supplied to the laser light source as a driving current, and the intensity of the main laser beam which is irradiated on the optical disc is controlled accordingly. The video signal (frequency division multiplexed signal) is recorded on successive tracks on the optical disc by the known recording means 20.

As described heretofore, according to the present invention, it is possible to set the laser power of the laser beam to an optimum recording value for carrying out an optimum recording. In addition, the frequency-division-multiplexing ratio of the frequency converted carrier chrominance signal with respect to the FM luminance signal is increased approximately proportionally to the relative linear velocity between the optical disc which rotates at a constant angular velocity and the main laser beam which scans the optical disc, and for this reason, it is possible to always keep the frequency-division-multiplexing ratio between the two signals constituting the frequency division multiplexed signal constant. Therefore, it is possible to suppress the change in the quality of a reproduced picture caused by the change in the relative linear velocity, and it is possible to obtain a reproduced picture having a constant picture quality regardless of the radial scanning position on the optical disc. Moreover, since the amplitude of the entire frequency division multiplexed signal is increased approximately proportionally to the relative linear velocity, it is possible to always carry out a high quality recording with an optimum laser power.

Further, the present invention is not limited to these embodiments, but various variations and modifications may be made without departing from the scope of the present invention.

What is claimed is:

1. An optical disc recording apparatus for recording by use of a laser beam a frequency division multiplexed signal on an optical disc which is rotated at a constant angular velocity, said frequency division multiplexed signal being constituted by a frequency modulated luminance signal and a frequency converted carrier chrominance signal which has been frequencyconverted into a frequency range lower than a frequency range of the frequency modulated luminance signal, said optical disc recording apparatus comprising:

multiplexing means for frequency-division-multiplexing the frequency modulated luminance signal and the frequency converted carrier chrominance signal with a variable frequency-division-multiplexing ratio so that a frequency-division-multiplexing ratio of the frequency converted carrier chrominance signal with respect to the frequency modulated luminance signal becomes greater approximately proportionally to a relative linear velocity between the optical disc which rotates at the constant angular velocity and the laser beam which scans the optical disc;

limiter means for converting an output frequency division multiplexed signal of said multiplexing means into a square wave having a constant amplitude;

amplitude varying means for varying an amplitude of the output square wave of said limiter means approximately proportionally to said relative linear velocity; and recording means including a laser right source for generating the laser beam responsive to an output signal of said amplitude varying means.

2. An optical disc recording apparatus as claimed in claim 1 which further comprises control voltage generating means for generating a control voltage indicative of a radial scanning position of the laser beam on said optical disc, said control voltage being supplied to said multiplexing means and said amplitude varying means.

3. An optical disc recording apparatus as claimed in claim 2 in which said multiplexing means comprises a voltage controlled amplifier having a gain thereof controlled by said control voltage for amplifying the frequency converted carrier chrominance signal, and a mixer for frequency-division-multiplexing an output signal of said voltage controlled amplifier and the frequency modulated luminance signal.

4. An optical disc recording apparatus as claimed in claim 2 in which said amplitude varying means comprises a voltage controlled amplifier having a gain thereof controlled by said control voltage for amplifying the output square wave of said limiter means.

5. An optical disc recording apparatus as claimed in claim 2 in which said control voltage generating means generates a control voltage having a level which gradually increases as the radial ccanning position of the laser beam on said optical disc changes from an inner periphery to an outer periphery of said optical disc.

6. An optical disc recording apparatus as claimed in claim 2 in which said control voltage generating means generates a control voltage having a level which gradually decreases as the radial scanning position of the laser beam on said optical disc changes from an inner periphery to an outer periphery of said optical disc.

* * * * *